(No Model.)
A. D. ULRICH.
HORSE COLLAR.
No. 480,000. Patented Aug. 2, 1892.
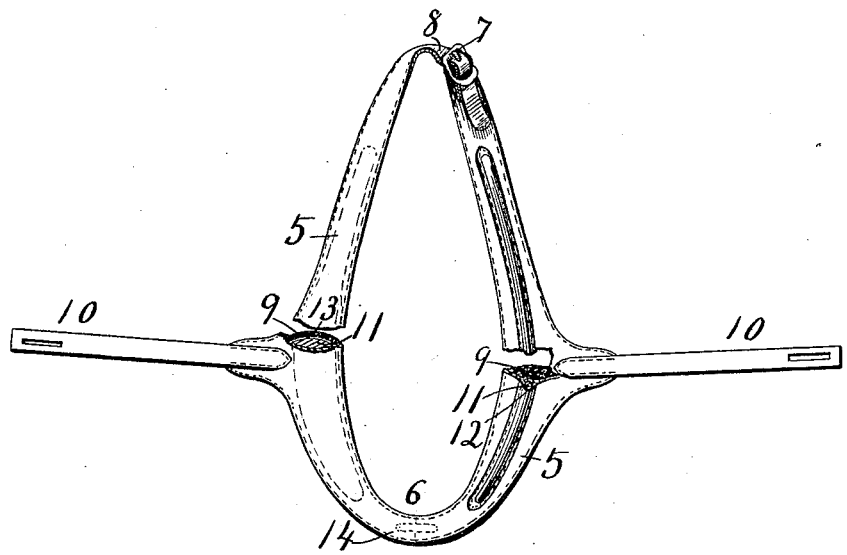
Fig I.
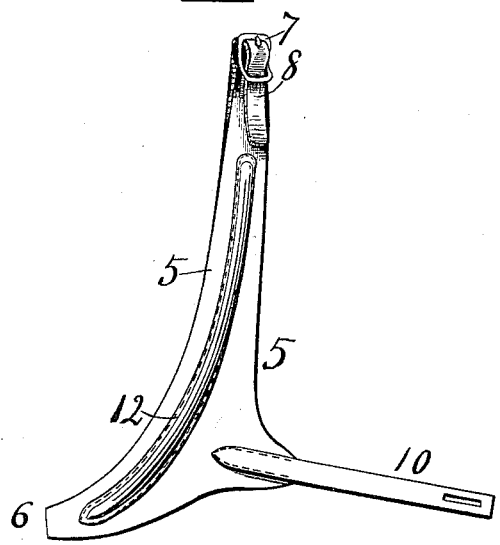
Fig II.
Witnesses,
P. E. Stevens
M. C. Hillyard
Inventor.
Allen D. Ulrich.
By W. X. Stevens Atty.
THE NORRIS PETERS CO., PHOTO-LITHO., WASHINGTON, D. C.

United States Patent Office.

ALLEN D. ULRICH, OF KOKOMO, INDIANA.

HORSE-COLLAR.

SPECIFICATION forming part of Letters Patent No. 480,000, dated August 2, 1892.

Application filed August 24, 1891. Serial No. 403,589. (No model.)

*To all whom it may concern:*

Be it known that I, ALLEN D. ULRICH, a citizen of the United States, residing at Kokomo, in the county of Howard and State of Indiana, have invented certain new and useful Improvements in Horse-Collars; and I do hereby declare the following to be a full, clear, and exact description of the invention, such as will enable others skilled in the art to which it appertains to make and use the same.

This invention relates to horse-collars. Heretofore horse-collars have been usually so constructed as to serve as a mere padding to support stiff hames upon the breast and shoulders of a horse, and such collars, however well padded, frequently gall the horse.

In many styles of harness, and especially in light harness of modern style, the hames and collar are dispensed with and a flexible breast-strap or collar is substituted with great advantage to bear the draft.

The object of this invention is to produce a horse-collar with sufficient stiffness at each side to distribute the strain of draft up and down the whole shoulder and to maintain the collar in proper form and yet with the flexibility in front of a mere breast-strap and with like flexibility over the top, and at the same time to produce a horse-collar in a single piece of light weight and stylish appearance.

To this end my invention consists in a horse-collar shaped and constructed as hereinafter described and claimed, reference being had to the accompanying drawings, in which—

Figure I is a front view of a collar according to my invention spread out flat and showing at the right the preferred form and at the left a modification thereof, certain parts at each side being broken away to show the interior arrangement in a somewhat sectional view. Fig. II is a side view of the collar in position for service.

5 represents the leather forming the outer side or facing of the collar, and it may be one continuous piece to surround the horse's neck, or for greater economy in cutting the leather it may be made of two parts permanently joined together at the breast 6 and be provided with a buckle 7 and a strap 8 to engage the buckle, whereby the upper portion of the collar may be opened to pass it around the horse's neck and then be made fast when in position for service.

The collar may have any suitable padding 9 up and down its sides to serve as cushions upon the horse's shoulder, and it may be made of any number of thicknesses of leather suitably secured together, and it may further be provided with straps 10, to which the traces of the harness may be attached.

11 represents a pair of stiffeners to perform the usual service of hames; but these stiffeners are permanently secured to the sides of the collar in any manner usual in harness-making—such, for example, as placing a stiffener upon the facing 5 and sewing down over it a cover 12 to fit tightly upon it like a sheath to keep it closely in place, as seen at the right in Fig. I, or the stiffener may be placed between the outer facing 5 and a lining 13, as shown at the left. In either case these stiffeners must be permanently fixed to the sides of a collar to serve the purpose of spreading the strain of the draft which takes place at the straps 10 evenly over the horse's shoulders up and down their whole height; but the stiffeners must not be joined nor in any way rigidly connected across the breast at 6, nor in the region of the strap 8; but the collar must be left flexible in both these places, so that it may readily bend to accommodate every move of the horse's shoulders from side to side. This permits each side of the collar to bear closely upon the horse's shoulders at all times while the shoulders are moving forward or backward and upward and downward without being slipped at every such move, as would be the case where the two sides of the collar are rigidly joined to act as a unit. By this means the horse is enabled to exert his whole strength without being annoyed by the sliding and chafing of the collar.

The stiffeners 11 are preferably made of steel; but they may also be made of other metal or of wood or any other suitably-stiff material to accomplish the purpose stated. The portion 6 crossing the breast may be made of webbing or leather or even a few links of chain to permit the desired flexibility, whereby the pad upon each shoulder is permitted to move forward and back with the horse's shoulder in traveling without lifting or displacing the opposite pad, thus avoiding chafing the horse. The narrow stiffener has all the advantage of spreading the strain of the trace up and down the shoulder without forming a stiff collar. The trace being hitched to the collar instead of to the stiffener or hame holds the flexible portion of the collar straight and smooth and has no tendency to press the stiffener upon the shoulder, both of which advantages would be lost if the trace were hitched, as usual, to the hame or stiffener.

This collar may be made light or heavy and in any style required either for service or to suit the taste of the purchaser, and by dispensing with hames it is more simple and easier of application than the usual draft-collar and hames, and yet it supplies to the light road-harness all the advantages of hames without their cumbersome and unsightly appearance. When collars are made in this way for double harness, the ring or loop-iron for attaching the pole-strap may be fixed part way across the flexible portion, as shown in dotted lines at 14; but this portion must still be left flexible at the sides of the iron to accord with my invention.

Having thus fully described my invention, what I believe to be new, and desire to secure by Letters Patent, is the following:

A horse-collar having cushioned or padded side portions, a flexible unpadded portion joining the side portions in front, a flexible portion to join the pads at the top, stiffeners permanently secured up and down the shoulders upon the pads, and means for attaching traces to the pad portions at a distance from the stiffeners, substantially as described, whereby the collar is adapted to bend freely at the front and top to permit the pads to rest steadily on the horse's shoulders while each shoulder advances and recedes to avoid chafing.

In testimony whereof I affix my signature in presence of two witnesses.

ALLEN D. ULRICH.

Witnesses:
THOMAS C. McGOVEN,
JOHN J. ULRICH.